R. S. TROTT.
VEHICLE SPRING.
APPLICATION FILED MAR. 6, 1913.
1,199,322. Patented Sept. 26, 1916.
8 SHEETS—SHEET 5.
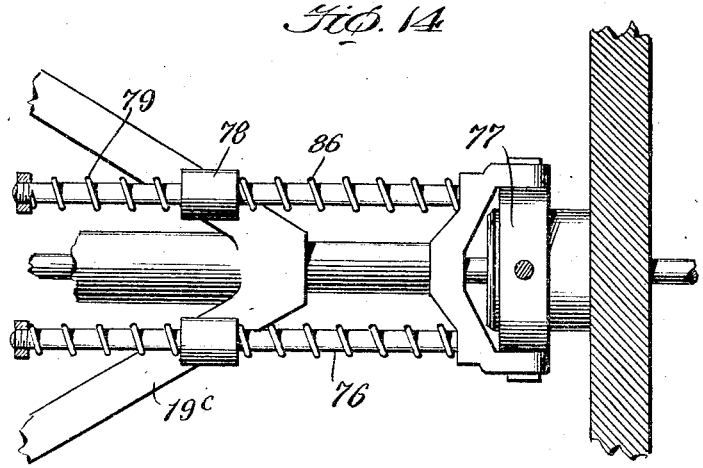
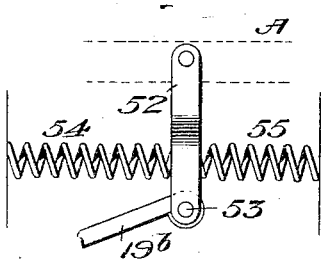
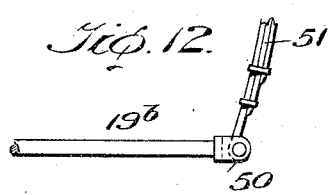
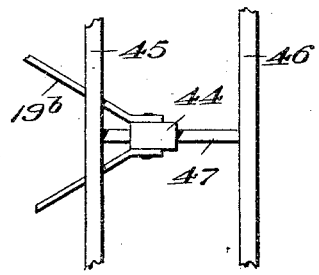
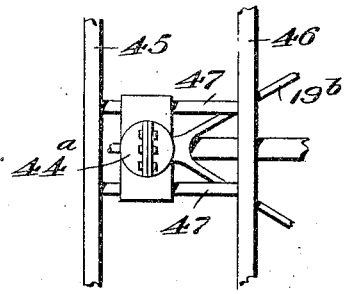
Inventor
Rolland S. Trott
By Vernon E. Hodge
his Attorney
Witnesses
Lloyd W. Patch R. S. TROTT.
VEHICLE SPRING.
APPLICATION FILED MAR. 6, 1913.
1,199,322.
Patented Sept. 26, 1916.
8 SHEETS—SHEET 7.
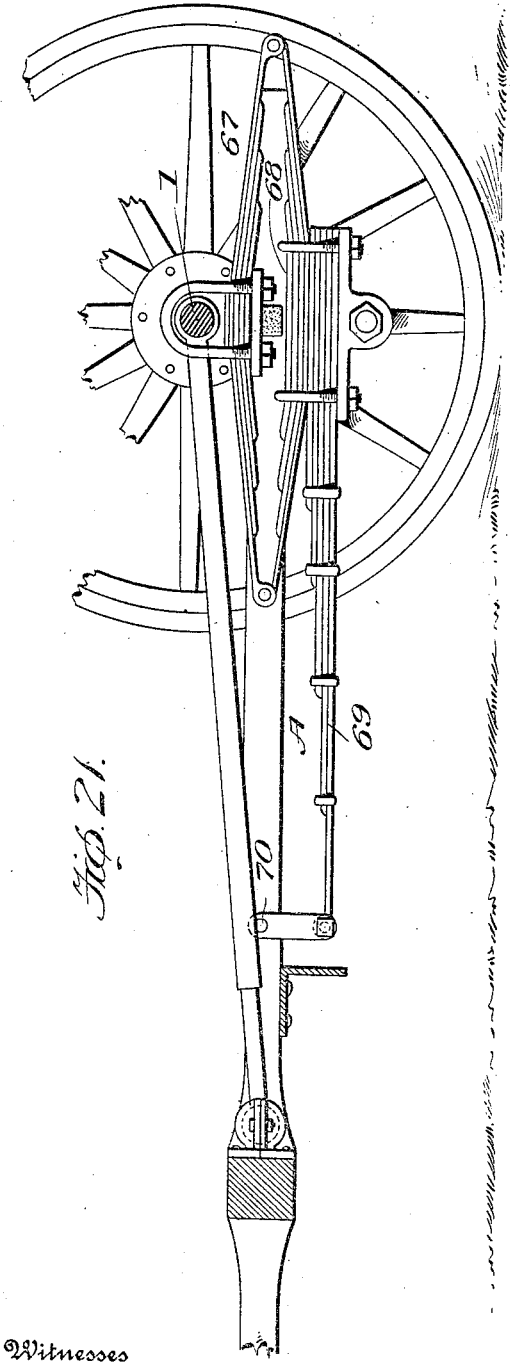
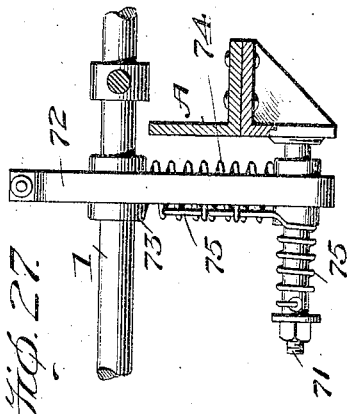
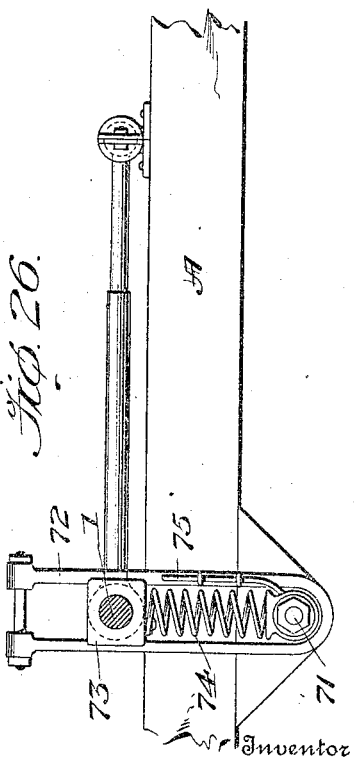

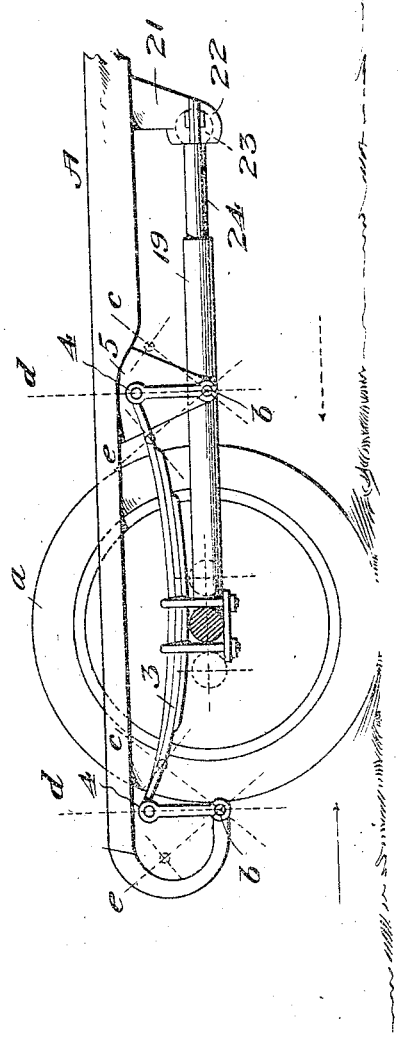
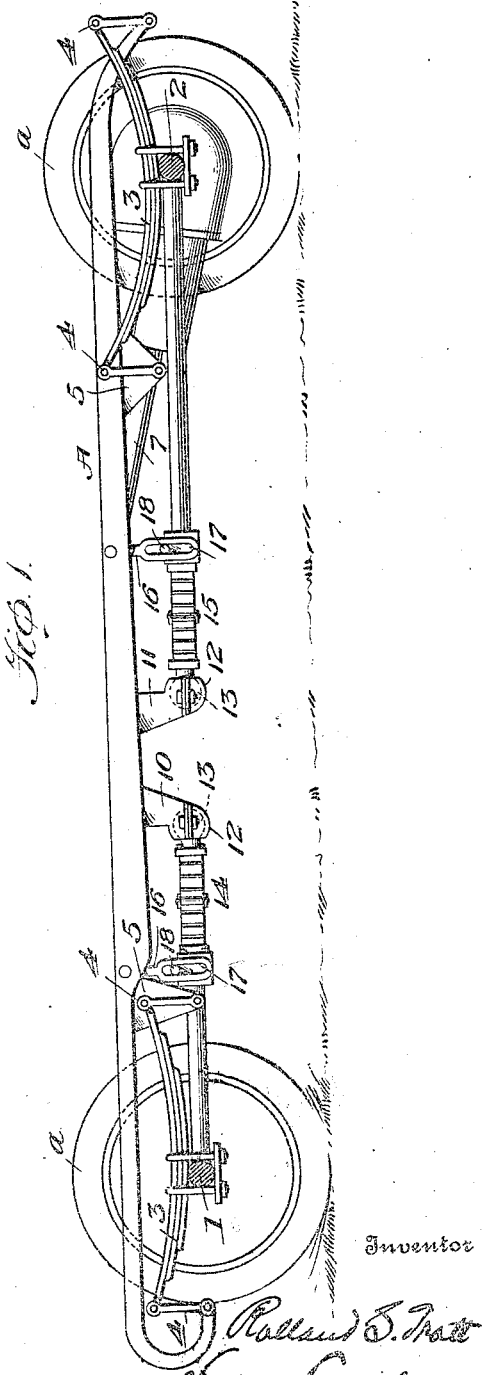

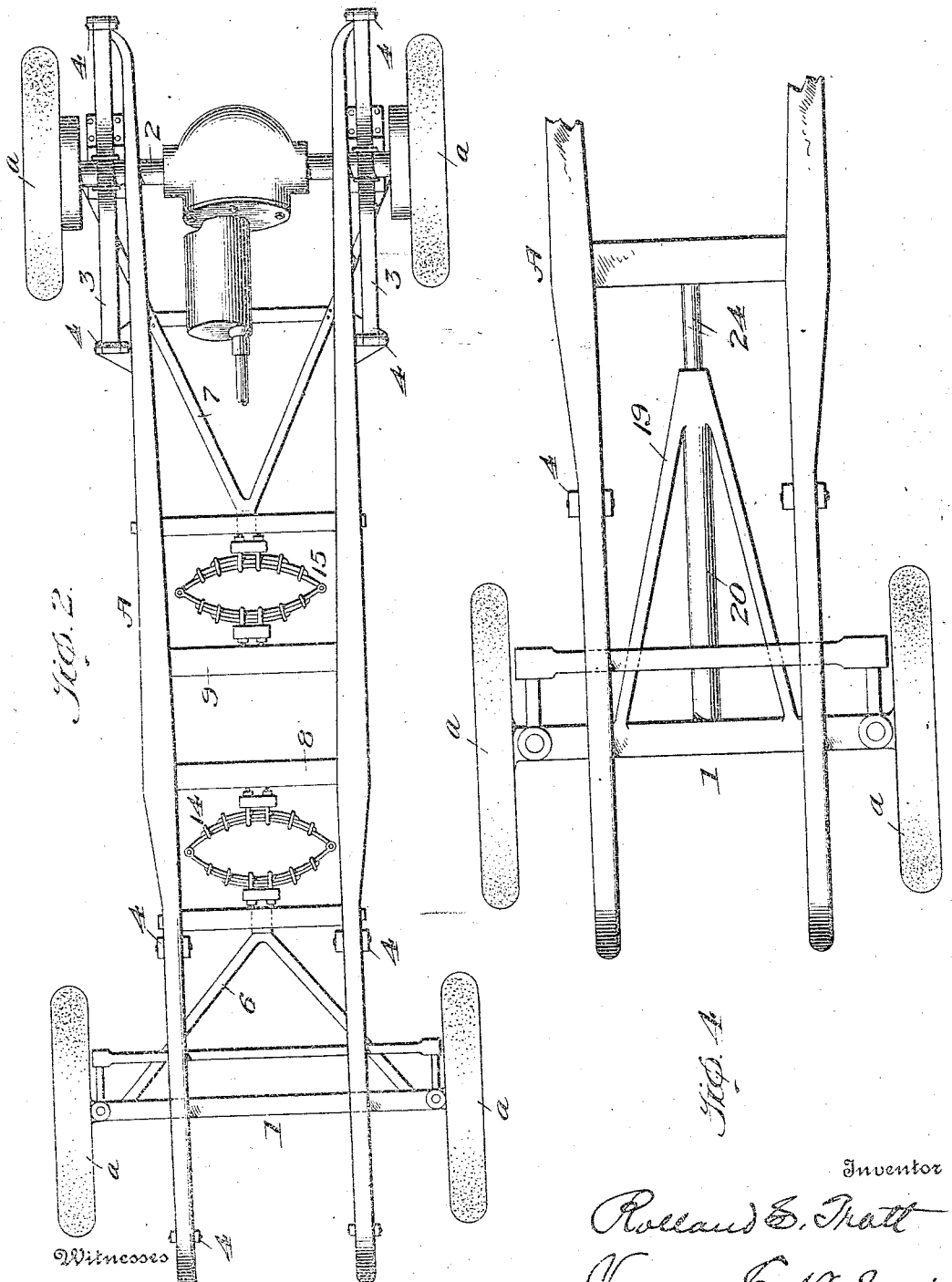

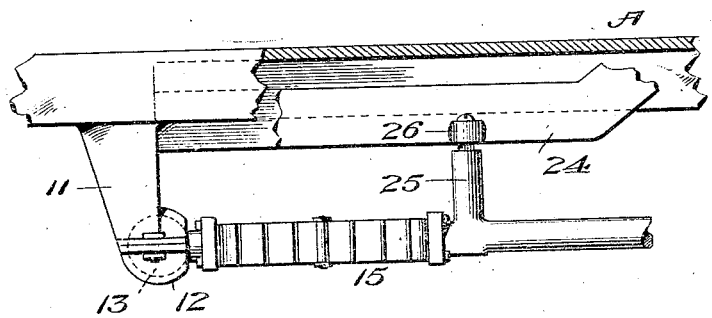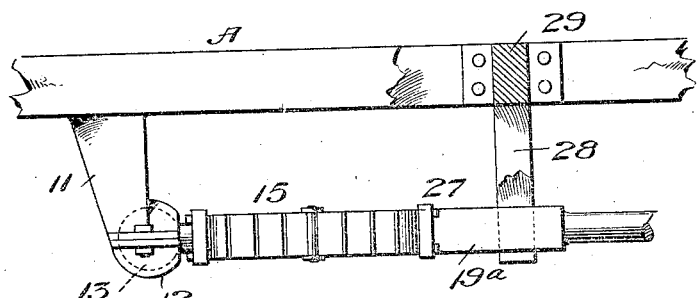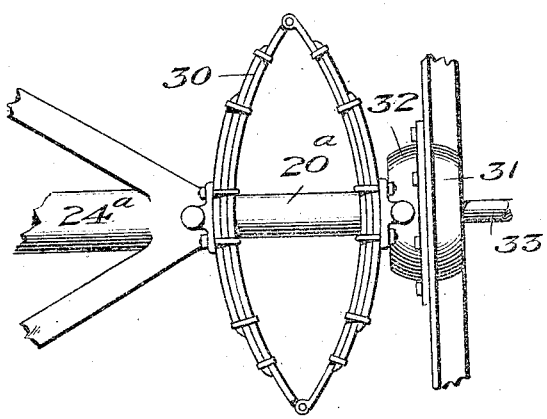

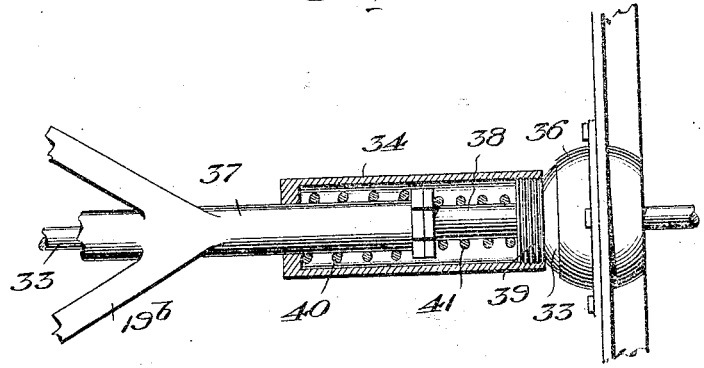
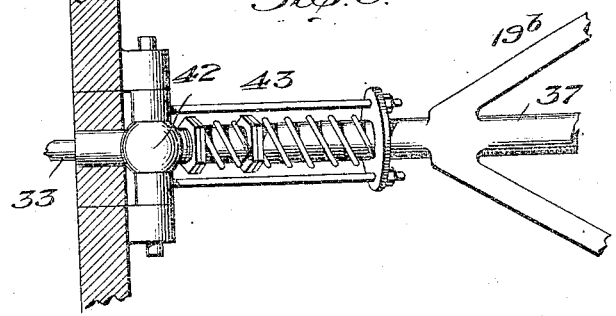
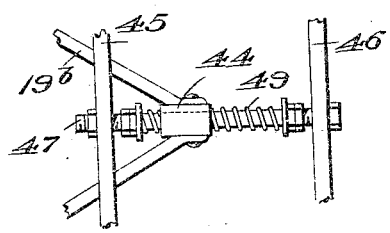 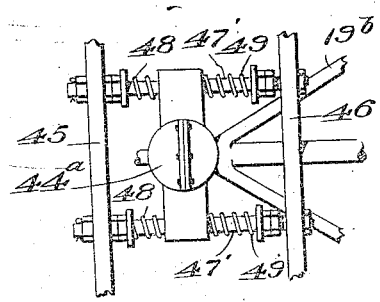

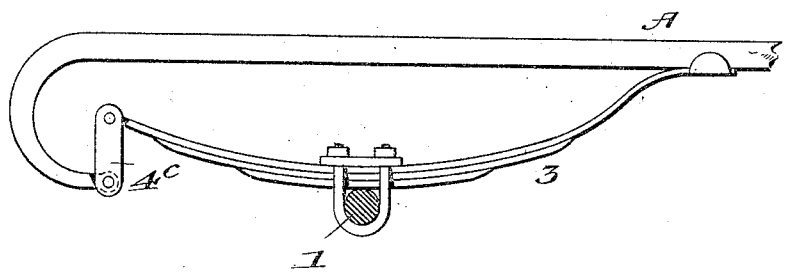
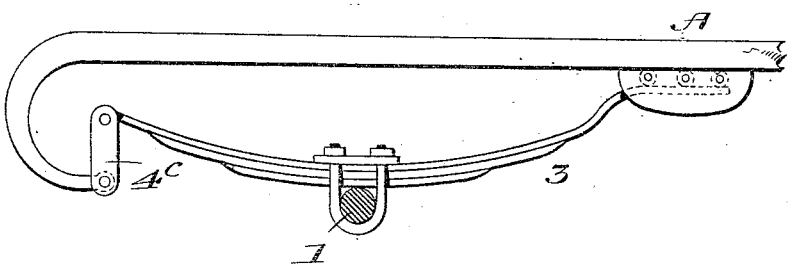
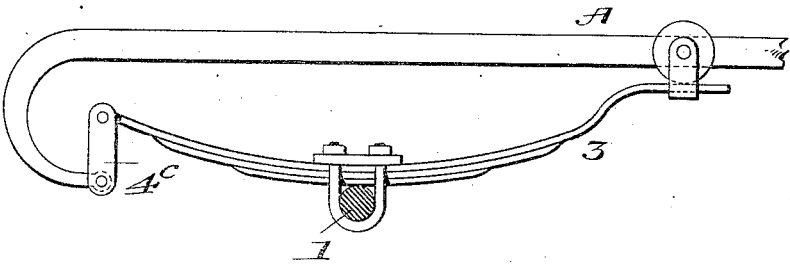
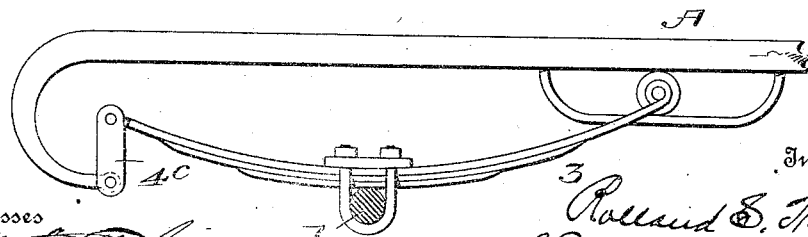

UNITED STATES PATENT OFFICE.

ROLLAND S. TROTT, OF DENVER, COLORADO.

VEHICLE-SPRING.

1,199,322.

Specification of Letters Patent. Patented Sept. 26, 1916.

Application filed March 6, 1913. Serial No. 752,394.

*To all whom it may concern:*

Be it known that I, ROLLAND S. TROTT, a citizen of the United States, residing in the city and county of Denver and State of Colorado, have invented certain new and useful Improvements in Vehicle-Springs, of which the following is a specification.

My invention relates to an improvement in vehicle springs, and more particularly to the type of spring disclosed in Patents Nos. 1,029,731 and 1,029,732, issued to me June 8, 1912, on which the present device is an improvement.

The object of this invention is to provide a spring structure for vehicles in which the load springs are mounted to permit movement of the axle in a direction longitudinally of the frame, and to right themselves and restore the axle to its normal position.

A further object is to provide means connected with the axle in such a manner that the axle will, irrespective of its movement, be held in a position approximately at right angles to the longitudinal extent of the frame.

A still further object is to provide means whereby the movement of the axle, permitted by the connection of the load spring, is resiliently opposed, and the load springs are aided in their restoration when the axle has been moved from its normal position.

With these objects in view, this invention consists of certain novel features of construction and combinations of parts which will be hereinafter more fully described and pointed out in the claims.

Figure 17:
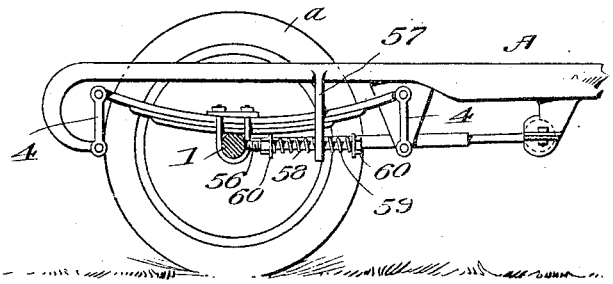
Figure 18:
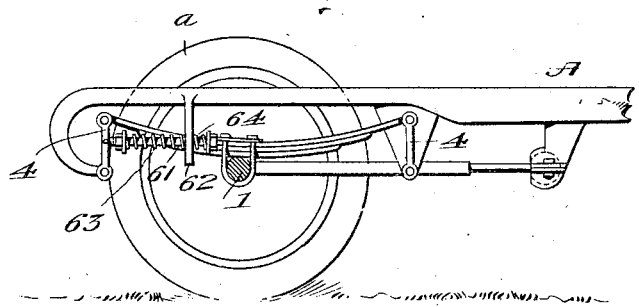
Figure 19:
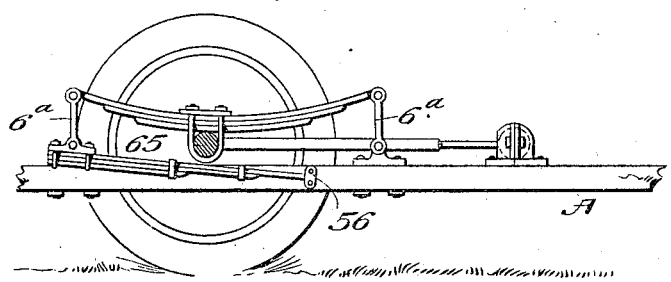
Figure 20:
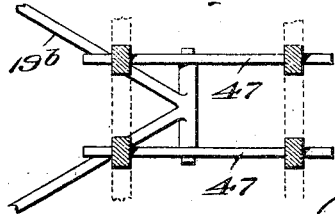

In the accompanying drawings: Figure 1 is a view in side elevation of the chassis of a motor vehicle, disclosing one form which this invention may take applied thereto, Fig. 2 is a top plan view, Fig. 3 is a view similar to Fig. 1, of one end of a vehicle, illustrating a simple form of the invention and, in a diagrammatic way, the operation, Fig. 4 is a top plan view of the structure in Fig. 3, Figs. 5, 6, and 7 are views of modified forms of connecting spring and holding means between the reach and frame, Figs. 8, 9, 10, 11, 12, 13, and 14 are still other modifications of this mechanism, Figs. 15 and 16 disclose connecting and holding means adapted for use without the spring, Figs. 17, 18, and 19 are views in side elevation of the one end of the vehicle frame, in which the supplemental restoring action is induced by a spring connected between the axle or load spring and the frame, Fig. 20 is a detail view to illustrate one manner in which the holding means may be connected to the frame, Fig. 21 is a view in side elevation of one end of a frame, disclosing the structure of the so-called underslung type, mounted in connection with a full elliptic spring, Figs. 22, 23, 24, and 25 disclose modified forms of semi-elliptic load springs which might be used, and, Figs. 26 and 27 are views in side elevation and transverse section respectively, to illustrate one adaptation of the spiral or helical spring.

Referring to the structure disclosed in Figs. 1 and 2: The frame A is supported by the front and rear axles 1 and 2 through the medium of load springs 3—3. The load springs are in this instance illustrated as of the multiple leaf semi-elliptic type, which are connected at their ends with the frame through links 4—4. The frame is of the so-called overslung type, and the connection of the links 4—4 is at the brackets 5—5, so that the links have a pulling strain from their connection with the frame, rather than a compression strain, which would be sustained if the links 4 were connected directly with the frame, and the load springs connected with the free ends of the links below the frame as disclosed in my patents above referred to. The V-shaped brace 6 is secured at its extremities near the ends of the axle 1, and a similar brace 7 is secured in a like manner on the axle 2. Cross braces 8 and 9 are secured between the side members of the frame A, and brackets 10 and 11 depend from the lower sides thereof approximately at the center. Each of the brackets has formed on its lower end the socket member 12 of a ball and socket joint. The ball member 13 is adapted to be held against pull or thrust in this socket member and a full elliptic spring 14 is secured to the reach, the bars 6, and to the ball 13, held at a fixed point on the cross bar 8. A similar full elliptic spring 15 is secured between the angle of the brace 7, and the ball member 13, held at a permanent point by the cross bars 9 of the frame.

The structure as described would be under normal conditions, operative and efficient, but in some instances where a great shock is received by one of the wheels $a$ and the wheel on the opposite end of the axle receives no shock at all, the reach might have a tendency to twist, and by forcing the restoring spring connected with the end thereof, and with the frame, permit the axle to swing from its right-angular alinement. To guard against this, I provide a form of toggle 16 which is pivoted to the frame A and fits over the angle end of the reach. Slots 17 are formed in that portion of the toggle which fits the reach, and a pin 18 is received through the slot. In this way the backward and forward movement of the reach and the angular movement due to the compression of the load springs is permitted, but the forward end of the reach is held against any lateral movement.

In Figs. 3 and 4 I have disclosed one of the simplest forms of the invention. The frame A, axle 1, wheel $a$, and spring 3 are of the form described. The load spring 3 is connected with the brackets 5 of the frame by the links as heretofore described, and so connected that a pulling strain is transmitted to them. The reach 19 is made V-shaped in plan, and is at its extremities connected near the ends of the axle 1. A central tubular member 20 is provided at the angle of the reach or brace. A bracket 21, carried by the frame, has the socket 22 formed on the lower end, and the ball member 23 is adapted to fit this socket. A cylindrical member 24 is secured to the ball 23 and fits into the tubular member 20 of the reach. In this way the axle has freedom of movement in a direction longitudinal of the frame. The reach 19, through the cylindrical member 24, being extensibly connected at the fixed point or socket 22 on the frame, in a shock transmitted to the wheel $a$ in the direction of the full line arrow will cause the links 4 to be swung around their pivotal connection $b$ with the frame to a greater or lesser angle as indicated by the diagonal line $b$—$c$. Since the links 4 are mounted between the load spring and frame in such a manner that a pulling strain is transmitted to them, their tendency is to center, and the greater the load the greater this tendency. The links therefore right themselves to the position indicated, so that they stand in a vertical line as indicated by the dotted line $b$—$d$. If a shock is transmitted in the direction of the dotted arrow to the wheel $a$, the links swing in a direction indicated by the diagonal line $b$—$e$, and again the tendency of the links 4 to right themselves restores the axle 1 to its normal position. In this way the axle is free to move in a direction longitudinal of the frame, and is held by the reach 19 and the connection with the frame always in a position approximately at right angles to the longitudinal extent of the frame. The connection of the axle with the frame through the load spring and the links is such that as the axle moves in the horizontal longitudinal direction the tendency is against said movement, and when the pressure causing this movement is relieved, the axle is returned to normal position.

In Fig. 5 a reach and restoring spring similar to that disclosed in Fig. 1 is shown, but in this instance the toggle is not used. Guide bars 24—24 are secured to extend longitudinally of the frame above the angle of the reach. A bracket 25 is carried by the inner end of the reach, and a friction wheel 26 is revolubly mounted on the bracket to be received in the guide way between the bars 24. The friction wheel 26 is of less diameter than the width of the guideway, so that under normal conditions there is no bearing of the wheel 26 against the bars 24, but immediately a twisting strain is transmitted to the forward end of the reach, the wheel 26 bears against one of the bars 24 and prevents movement of the end of the reach.

In Fig. 6 the end of the reach adjacent the angle has bearings 27 formed. Brackets 28—28 are carried by a cross bar 29 secured to the form to project downwardly and embrace the reach $19^a$. The brackets 28 are spaced apart a distance greater than the width of the bearing 27 for the reason stated in the description of Fig. 5, and the reach has free movement longitudinally and vertically between these braces.

In Fig. 7 is shown a combination of the structure of Figs. 1—2 and 3—4. In this structure the tubular member $24^a$ has a full elliptic spring 30 secured thereto, and the spring on its opposite side is connected to the ball member 31, which is held in the socket member 32 at a fixed point on the frame. The cylindrical member $20^a$ is in this instance also tubular, and the ball and socket joint is made hollow so that the drive shaft 33 can extend therethrough, and through the tubular member $24^a$ of the reach down to a position to drive the axle.

In Fig. 8 a spring casing 34 is carried by the ball member 35 held in a socket 36 on the frame. An extension 37 on the reach $19^b$ extends into the casing 34 and embraces a cylindrical member 38. A nut or collar 39 is carried by the end of the extension 37, and shock and rebound springs 40 and 41 are received around the extension 37 and cylindrical member 38 to bear against the collar 39 and resiliently oppose movement of the reach $19^b$ endwise.

The structure disclosed in Fig. 9 is identical, with the exception that a universal joint 42 of different construction is used, and a skeleton work 43 takes the place of the spring casing 34 shown in Fig. 8.

In Fig. 10 a bearing member 44 is formed at the angle of the reach. Cross bars 45 and 46 are secured to the frame. A rod 47 is mounted between these cross bars and the bearing 44 is fitted over the rod. Shock and rebound springs 48 and 49 are received around the rod on either side of the bearing 44 to resiliently oppose movement of the bearing along the rod.

In Fig. 11 two rods 47 are provided and a tubular yoke bearing 44ª. Otherwise the structure is similar.

In Fig. 12 the reach is shown as having bifurcated portion 50, and a leaf spring 51 secured to the frame is pivoted in the bifurcated portion, so that the reach can have movement horizontally in longitudinal direction, but is prevented from side movement.

In Fig. 13 a toggle 52 is pivoted to the frame and the reach is pivotally connected at 53 with the toggle. Shock and rebound springs 54 and 55 are positioned to bear against the toggle on opposite sides and resiliently oppose swinging movement thereof around the pivotal connection with the frame. In Figs. 15 and 16 the structure disclosed is similar to that shown in Figs. 10 and 11, the exception being that the shock and rebound springs are omitted. These forms of connection between the reach and frame are particularly adaptable to the structure disclosed in Figs. 17, 18, 19, 21, and 26.

In the disclosure in Fig. 14, rods 76 are connected at their one end with the universal joint 77 and are mounted to slide in bearings 78 carried by the reach 19ᶜ, the springs 79 and 80 being mounted on the rods on either side of the bearings to resiliently oppose sliding movement of the rods through the bearings.

In the form of the invention shown in Fig. 17 the bars are connected as in Figs. 3 and 4. A rod 56 is connected with the axle 1 and has free sliding movement through bearings 57 depending downwardly from the frame A. Shock and rebound springs 58 and 59 are received around the rod 56 on each side of the bearing 57, and the springs are held on the rod by nuts 60—60, which are also adapted to adjust the tension of these springs. In Fig. 18 the structure is similar to that in Fig. 17, but in this instance a rod 61 is pivotally connected to one of the links 4 at a point away from the pivotal connection of the link with the frame. A bracket 62 is carried by the frame, and the rod 61 has free sliding movement therethrough. This sliding movement is opposed by the shock and rebound springs 63 and 64, and the tendency of the link 4, with which the load spring is connected, to swing around its point of pivotal connection with the frame is resiliently opposed.

In Fig. 19 the reach, load spring and the connection of the load spring with the frame are the same, the exception being that the frame is of the underslung type. In this form the link 6ª has a bearing formed at a point beyond the pivotal connection with the frame. A rectilinear leaf spring 65 is secured on this bearing, and its opposite end is connected by a link 66 with the frame. Any tendency of the link 6ª to swing around its pivotal connection with the frame causes the rectilinear spring, through its connection with the bearing of the link 6ª to be bowed in one direction or the other, and the flexibility of the spring acts to resiliently oppose said pivotal movement and to restore the link when the pressure causing that movement is relieved.

In Fig. 20 another form of connection which might be used between the inner end of the reach and the frame is shown, the rods 47 are connected to the forward end of reach 19ᵇ and slide through bearings 81 carried to depend from the frame.

In Fig. 21 a structure very similar to that illustrated in Fig. 19 is shown. With this structure a full elliptic spring 67 is connected on its lower side at 68 with the frame, and on its upper side and, at a point vertically above, with the axle 1. A rectilinear leaf spring 69 is secured to the spring 67 adjacent the pivotal connection with the frame, and the free end of this spring 69 has connection at 70 with the frame A. In this structure the axle 1 tends to swing pivotally around the connection 68 of the load spring with the frame. This causes the rectilinear spring 69 to be bowed, and in this way the spring 69 resiliently opposes the movement of the axle and restores the axle.

In Figs. 22, 23, 24 and 25 modifications of the form of load springs are shown. In this instance the spring is disclosed as of the semi-elliptic type, with one end connected by a link 4ᶜ to the bracket 5 of the frame A, and the opposite end of the spring bears against the frame where it is held against sidewise displacement, but has free movement longitudinally of the frame.

In Figs. 26 and 27 a pivot pin 71 is mounted on the frame. The yoke 72 is pivoted on this pin, and bearing 73 is received within the yoke slidably and carries the axle 1. Spiral spring 74 is held at one end in the bearing 73, and at its opposite end by the yoke adjacent its pivotal connection, and in this way the load carried by the frame causes the spiral spring to be strained vertically, and the bearing 73 moves up and down in the yoke. With this form the tendency would be for the yoke to restore the axle to its normal position, due to the pivotal connection of the yoke with the frame, but to supplement this restoring action, a helical spring 75 is received around the pin 71 and is secured at its one end thereto. The opposite end of the spring 75 is brought up alongside the yoke and is connected thereto, so that as the yoke swings around the pivot pin the helical spring exerts pressure to oppose said swinging movement.

It will thus be seen that I have provided a structure in which the axle is so connected with the frame that it has free movement longitudinally of the frame, and further, when the occasion requires, I have provided mechanism, which may be used to supplement said restoring action.

It is evident that there are still other means of connecting the axle with the frame, and yet other supplemental restoring means which might be resorted to, without departing from the spirit and scope of my invention, and hence I do not wish to limit myself to the exact description herein set forth, but—

Having fully described my invention, what I claim as new and desire to secure by Letters Patent is—

1. The combination with a vehicle frame and axle, of load springs, tension links connecting the load springs to the frame, and means for keeping the axle square.

2. The combination with a vehicle frame and axle, of load springs, tension links connecting the load springs to the frame, means for keeping the axle square, and a fixed point pivot connected to the frame to which said means extends.

3. The combination with a vehicle frame and axle, of load springs, tension links connecting the load springs to the frame, means for keeping the axle square, and means for resiliently opposing the swinging of the links and horizontal movement of the axle.

4. The combination with a vehicle frame and axle, of load springs, tension links connecting the load springs to the frame, means for keeping the axle square, a fixed point pivot connected to the frame to which said means extends, and means for resiliently opposing the swinging of the links and horizontal movement of the axle.

In testimony whereof I affix my signature, in the presence of two witnesses.

ROLLAND S. TROTT.

Witnesses:
F. H. WALLACE,
CHAS. E. STRATTON.